United States Patent
Feustel et al.

(10) Patent No.: US 9,647,473 B2
(45) Date of Patent: May 9, 2017

(54) APPARATUS AND SYSTEM FOR A MULTI-MODAL FLASHLIGHT AND CHARGING BASE

(71) Applicants: ZWEIBRÜDER OPTOELECTRONICS GMBH & CO. KG, Solingen (DE); LED LENSER CORP. LTD., Yangjiang (CN)

(72) Inventors: Stefan Feustel, Berlin (DE); Andre Kunzendorf, Wuppertal (DE)

(73) Assignees: Zweibruder Optoelectronics GmbH & Co. KG, Solingen (DE); LED LENSER Corp. Ltd., Yangjiang (CN)

( * ) Notice: Subject to any disclaimer, the term of this patent is extended or adjusted under 35 U.S.C. 154(b) by 54 days.

(21) Appl. No.: 14/406,952

(22) PCT Filed: Jun. 11, 2013

(86) PCT No.: PCT/IB2013/054787
§ 371 (c)(1),
(2) Date: Dec. 10, 2014

(87) PCT Pub. No.: WO2013/186707
PCT Pub. Date: Dec. 19, 2013

(65) Prior Publication Data
US 2015/0155728 A1      Jun. 4, 2015

(30) Foreign Application Priority Data

Jun. 11, 2012   (DE) .................. 20 2012 005 601 U
Jan. 8, 2013    (CN) .......................... 2013 1 0005733

(51) Int. Cl.
*F21L 4/00*   (2006.01)
*F21L 13/00*  (2006.01)
(Continued)

(52) U.S. Cl.
CPC ............ *H02J 7/0044* (2013.01); *F21L 4/005* (2013.01); *F21L 4/08* (2013.01); *F21L 4/085* (2013.01);
(Continued)

(58) Field of Classification Search
CPC ..... F21L 4/00; F21L 4/005; F21L 4/08; F21L 4/085; F21L 7/00; F21V 23/0414; F21V 14/045; F21V 14/065; G02B 15/14
(Continued)

(56) References Cited

U.S. PATENT DOCUMENTS 3,277,358 A * 10/1966 Nicholl .................. F21L 4/085
                                                15/22.1
3,982,120 A *  9/1976 Wynn ................ F21V 21/0965
                                                200/60
(Continued)

FOREIGN PATENT DOCUMENTS

DE    20 2009 005207 U1    12/2009
DE       202009005207 U1    12/2009

OTHER PUBLICATIONS

International Search Report from International Application No. PCT/IB2013/054787 dated Jan. 3, 2014.
(Continued)

*Primary Examiner* — Peggy Neils
*Assistant Examiner* — Erin Kryukova
(74) *Attorney, Agent, or Firm* — Alston & Bird LLP

(57) ABSTRACT

Provided herein is an improved apparatus and system for providing a flashlight and charging base system. The flashlight of may include a light source, a power source having a charge level, a housing defining a major axis along which the housing extends, an adjustable ring disposed about the housing, where the adjustable ring is configured to be rotated between at least two positions, where each of the at least two
(Continued)

positions define a different mode of operation, and a switch located proximate the barrel, where the switch is configured to turn the flashlight on and off. The adjustable ring may include a magnet, where the housing includes a Hall effect sensor, where the at least two positions of the adjustable ring are recognized by the position of the magnet relative to the Hall effect sensor.

21 Claims, 12 Drawing Sheets

(51) Int. Cl.
  H02J 7/00 (2006.01)
  F21L 4/08 (2006.01)
  F21V 14/06 (2006.01)
  F21V 23/04 (2006.01)
  H05B 37/02 (2006.01)
  F21Y 101/00 (2016.01)
(52) U.S. Cl.
  CPC ........ *F21V 14/065* (2013.01); *F21V 23/0407* (2013.01); *F21V 23/0414* (2013.01); *H02J 7/0047* (2013.01); *H05B 37/0209* (2013.01); *F21Y 2101/00* (2013.01)
(58) Field of Classification Search
  USPC .................................................. 320/115, 114
  See application file for complete search history.

(56) References Cited

U.S. PATENT DOCUMENTS

| | | | | |
|---|---|---|---|---|
| 4,092,580 | A * | 5/1978 | Prinsze | B60Q 3/007 |
| | | | | 320/115 |
| 4,782,432 | A * | 11/1988 | Coffman | F21L 4/025 |
| | | | | 136/291 |
| 5,165,048 | A * | 11/1992 | Keller | F21L 4/085 |
| | | | | 320/113 |
| 5,691,618 | A * | 11/1997 | Kobayashi | H02J 7/0045 |
| | | | | 320/115 |
| 5,772,309 | A * | 6/1998 | Groben | F21V 23/0407 |
| | | | | 362/183 |
| 6,208,734 | B1 * | 3/2001 | Ortscheid | B60R 11/0241 |
| | | | | 379/446 |
| 6,296,367 | B1 * | 10/2001 | Parsons | F21L 4/085 |
| | | | | 320/115 |
| D527,126 | S | 8/2006 | Opolka | |
| D583,087 | S | 12/2008 | Opolka | |
| 7,923,964 | B2 * | 4/2011 | Lin | H02J 7/0044 |
| | | | | 320/107 |
| 8,308,316 | B2 | 11/2012 | Sparrow | |
| 8,415,920 | B2 * | 4/2013 | Liao | H02J 7/0042 |
| | | | | 16/225 |
| 2005/0007066 | A1 * | 1/2005 | Long | B26B 19/3833 |
| | | | | 320/107 |
| 2005/0237737 | A1 * | 10/2005 | Kim | F21L 4/027 |
| | | | | 362/197 |
| 2006/0193129 | A1 | 8/2006 | Opolka | |
| 2008/0068833 | A1 | 3/2008 | Shiau | |
| 2009/0180271 | A1 | 7/2009 | Jachmann | |
| 2010/0052551 | A1 | 3/2010 | Sparrow | |
| 2010/0164401 | A1 * | 7/2010 | Matthews | F21V 23/0414 |
| | | | | 315/294 |
| 2010/0194337 | A1 * | 8/2010 | Opolka | H01R 13/22 |
| | | | | 320/114 |
| 2011/0204818 | A1 | 8/2011 | Spartano | |
| 2011/0222274 | A1 * | 9/2011 | Ko | F21L 4/00 |
| | | | | 362/191 |
| 2012/0317770 | A1 * | 12/2012 | Berger | H02J 7/0044 |
| | | | | 29/401.1 |
| 2013/0020996 | A1 * | 1/2013 | Kirtley | H02J 7/0044 |
| | | | | 320/113 |
| 2013/0176738 | A1 * | 7/2013 | Tinaphong | F21V 33/00 |
| | | | | 362/253 |
| 2013/0286639 | A1 * | 10/2013 | Choo | F21V 14/065 |
| | | | | 362/187 |

OTHER PUBLICATIONS

International Search Report and Written Opinion from International Application No. PCT/IB2013/054787 dated Jan. 3, 2014.
Floating Charge System [online] [retrieved Dec. 17, 2012]. Retrieved from the Internet: <URL: http://www.ledlenser.com/technology/FloatingChargeSystem>. (Dated Dec. 17, 2012) 1 page.
Office Action for European Patent Application No. 13 750 136.7 dated Feb. 19, 2016, 5 pages.

* cited by examiner

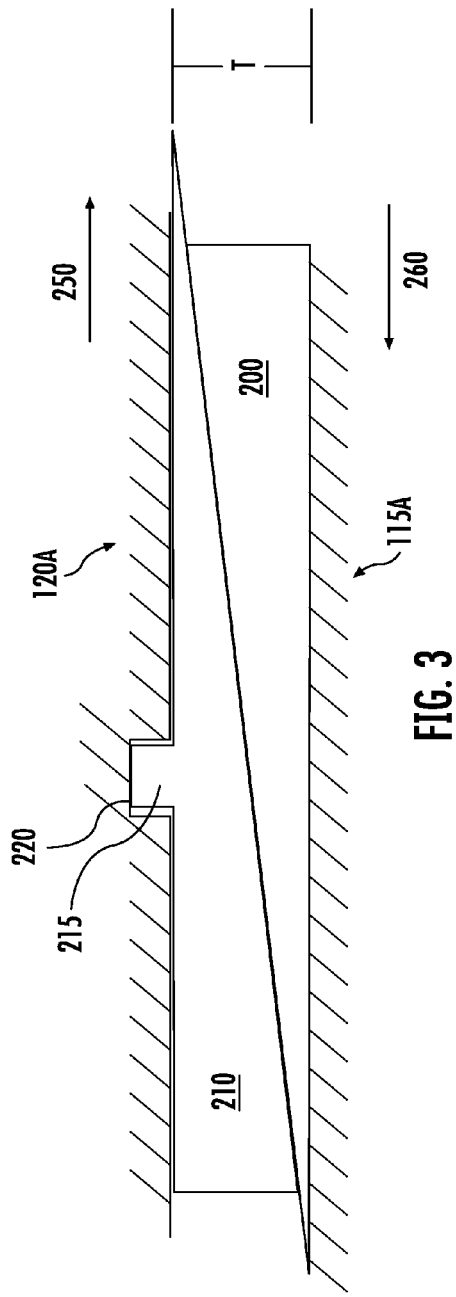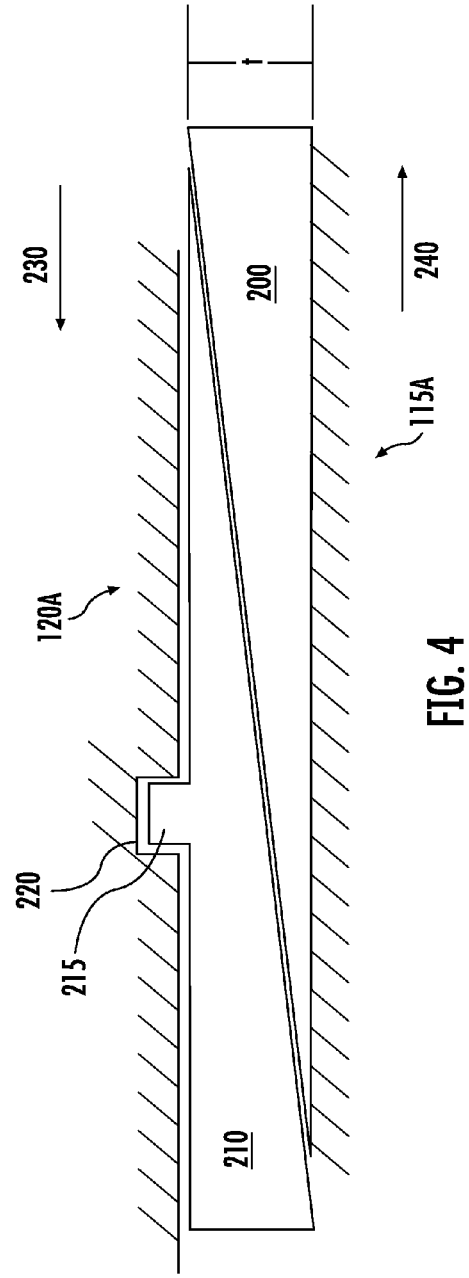

APPARATUS AND SYSTEM FOR A MULTI-MODAL FLASHLIGHT AND CHARGING BASE

FIELD OF THE INVENTION

Embodiments of the present invention generally relate to systems and methods for providing illumination and, more particularly, to an apparatus and system for a multi-modal flashlight and charging base.

BACKGROUND OF THE INVENTION

Electric light sources exist in a variety of form factors from residential or commercial light fixtures to hand-held flashlights. Conventional incandescent light bulbs have given way to more efficient fluorescent light bulbs and compact florescent light (CFL) bulbs to provide substantially similar light while consuming less power. While a florescent light is more efficient than an equivalently bright incandescent light, light-emitting diodes (LEDs) are more efficient still at producing an equivalent or brighter light in a particularly compact form factor.

LEDs were initially relatively expensive as compared to incandescent or florescent lights, and were not suitable for many applications. Additionally, low intensity and limited color options for LEDs limited their usefulness. Recent developments in the field of LEDs have caused LED light sources to become ubiquitous replacements or supplements to conventional light sources. Further, LEDs may be packaged in considerably smaller form factors than equivalently bright incandescent lights or florescent lights. LEDs may now be found in flashlights and other portable light sources which benefit from their compact size and energy efficiency.

As LEDs function in a manner different than that of florescent lights or incandescent lights, LEDs may offer functionality and utility previously not available in compact form factors, such as flashlights. Therefore, it may be desirable to exploit the capabilities of LEDs in compact form factors.

SUMMARY OF THE INVENTION

In light of the foregoing background, example embodiments of the present invention provide a flashlight and charging base system. The flashlight of example embodiments may include a light source, a power source having a charge level, a housing defining a major axis along which the housing extends, an adjustable ring disposed about the housing, where the adjustable ring is configured to be rotated between at least two positions, where each of the at least two positions define a different mode of operation, and a switch located proximate the barrel, where the switch is configured to turn the flashlight on and off. The flashlight of example embodiments may include a Hall effect sensor and the adjustable ring may include a magnet, where the at least two positions of the adjustable ring are recognized by the position of the magnet relative to the Hall effect sensor. The modes of operation include two or more of a strobe mode, a bright mode, a dim mode, and a secondary light wavelength mode.

According to some embodiments, the housing comprises a barrel and a light source housing, where the light source housing includes a lens and is adjustable relative to the barrel along the major axis to focus a beam of light emanating from the light source. The barrel and the light source housing may be adjustable relative to one another along the major axis. The barrel and the light source housing may be rotatably engaged. Rotation of the light source housing in a first rotational direction relative to the barrel may increase the friction force resisting movement between the light source housing and the barrel, and rotation of the light source housing in a second rotational direction, opposite the first rotational direction relative to the barrel, may decrease the friction force resisting movement between the light source housing and the barrel. The barrel may be configured to hold a first power source, and the barrel is interchangeable with a second barrel configured to hold a second power source that is different than the first power source. The adjustable ring may be configured to be removable from the housing.

Flashlights according to some embodiments of the present invention may include a first ramp shaped portion and a second ramp shaped portion, where the first ramp shaped portion is held fixed relative to the barrel, and where the second ramp shaped portion is held fixed relative to the light source housing. The first ramp portion and the second ramp portion may cooperate to increase a friction force between the barrel and the light source housing in response to rotation between the barrel and the light source housing in a first direction. The first ramp portion and the second ramp portion may cooperate to decrease the friction force between the barrel and the light source housing in response to rotation between the barrel and the light source housing in a second direction, opposite the first.

According to some embodiments of the present invention, the housing may include a charge indicator ring disposed about the major axis. The charge indicator ring may be configured to glow a first color in response to the charge level of the power source being above a threshold charge level, and the charge indicator ring may be configured to glow a second color in response to the charge level of the power source being below the threshold charge level. The charge indicator ring may be configured to glow in response to the light source being on, and may be configured to not glow in response to the light source being off. The housing may define a base and a plurality of charge indicator lights may be disposed about the base. The plurality of charge indicator lights may glow in response to the charge level of the power source.

Embodiments of the present invention may provide a charging base for a flashlight. The charging base including a base plate configured to be mounted to a surface, a receiver pivotably secured to the base plate and configured to receive a base of the flashlight, a cradle pivotably secured to the base plate and configured to receive a barrel of the flashlight, and a charge adapter configured to be received by the receiver and to engage the base of the flashlight. The charge adapter may be configured to be removable from the receiver for use independent from the receiver. The receiver may be substantially a cup shape including an opening, where the base of the flashlight may be configured to be received within the cup through the opening, where the receiver is biased to a position where the opening of the cup is facing away from the base plate. The charge adapter may include a magnet and the base of the flashlight may be attracted to the magnet of the charge adapter.

Embodiments of the present invention may provide a flashlight and charging base system including a flashlight and a charging base. The flashlight may include a light source, a power source including a charge level, a housing defining a major axis along which the housing extends, an adjustable ring disposed about the housing, where the ring may be configured to be rotated between at least two positions, where each of the at least two positions define a different mode of operation, and a switch located proximate the barrel, where the switch is configured to turn the flashlight on and off. The charging base may include a base plate configured to be mounted to a surface, a receiver pivotably secured to the base plate and configured to receive a base of the flashlight, a cradle pivotably secured to the base plate and configured to receive a barrel of the flashlight, and a charge adapter configured to be received by the receiver and to engage the base of the flashlight.

BRIEF DESCRIPTION OF THE DRAWINGS

Figure 1:
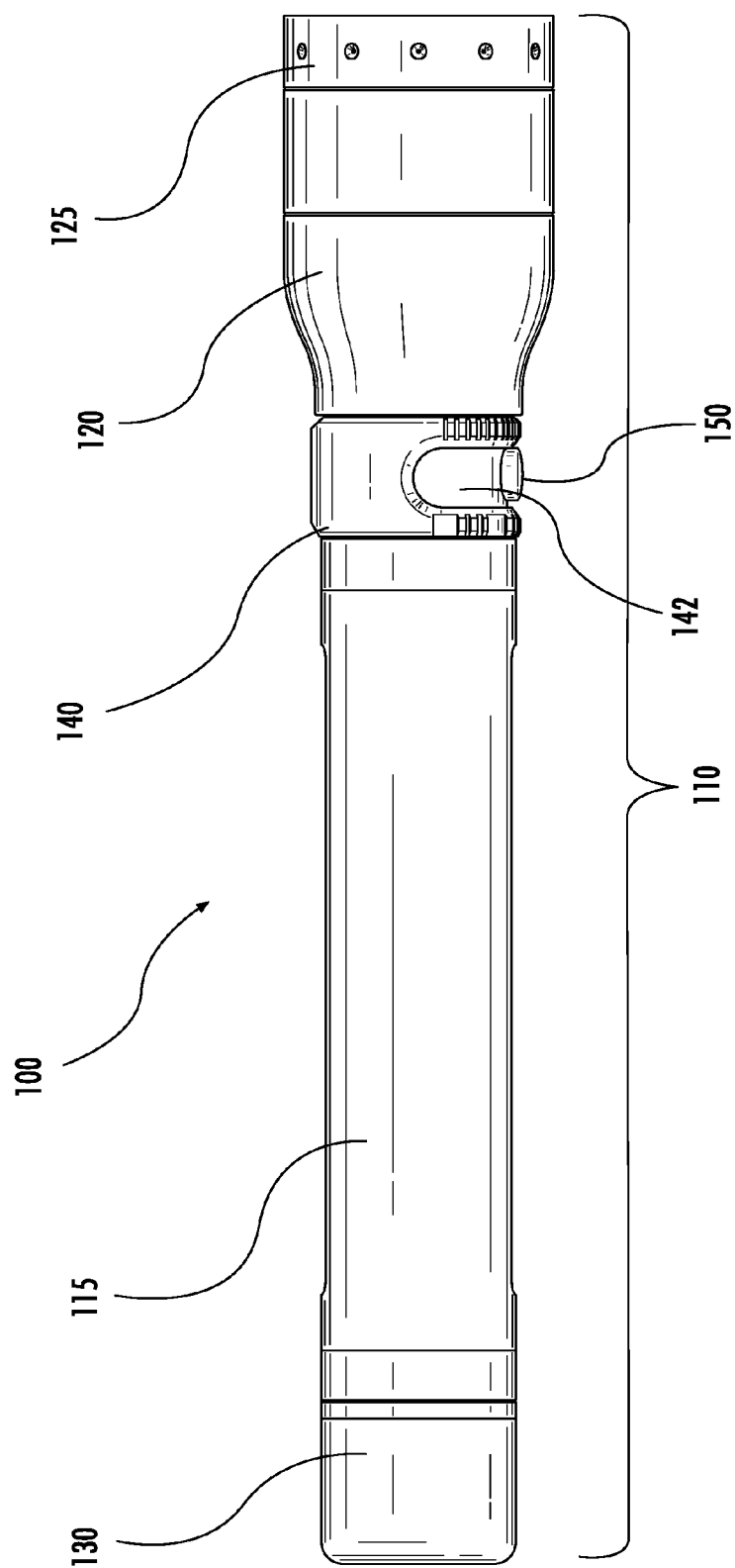
Figure 2:
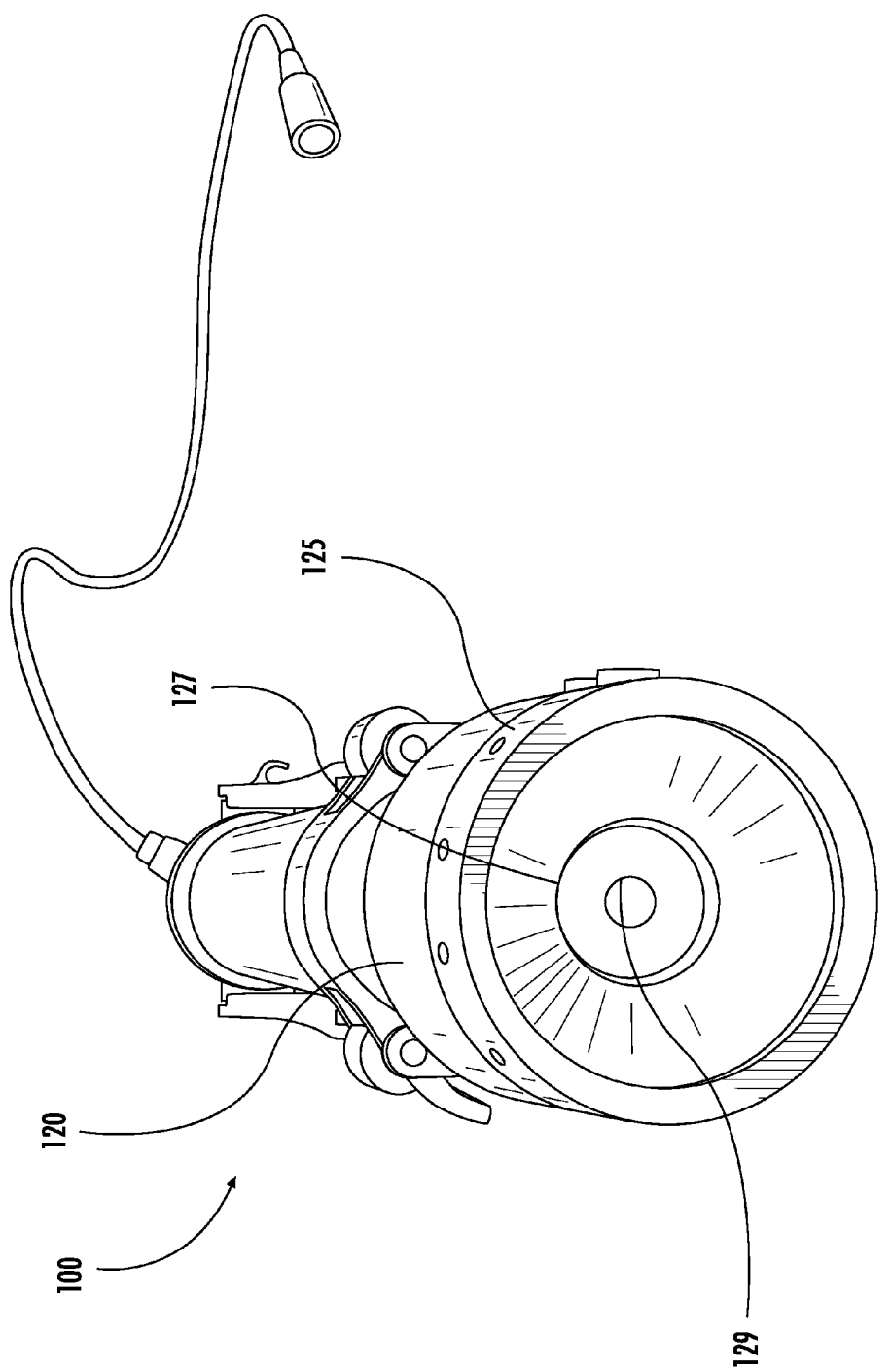
Figure 5:
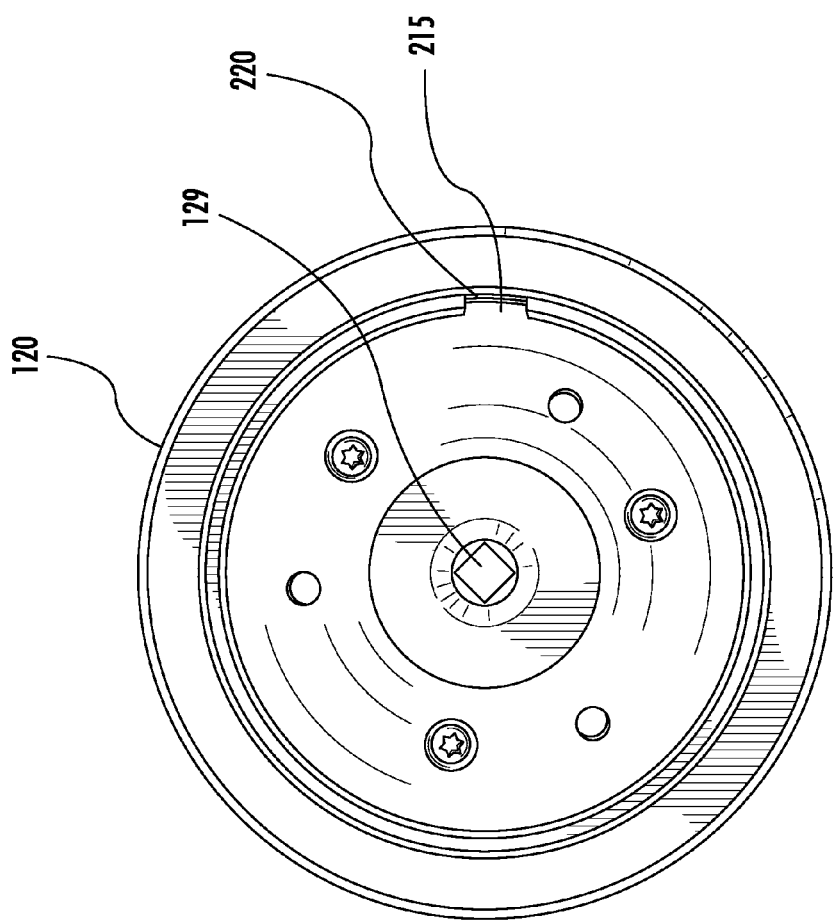
Figure 6:
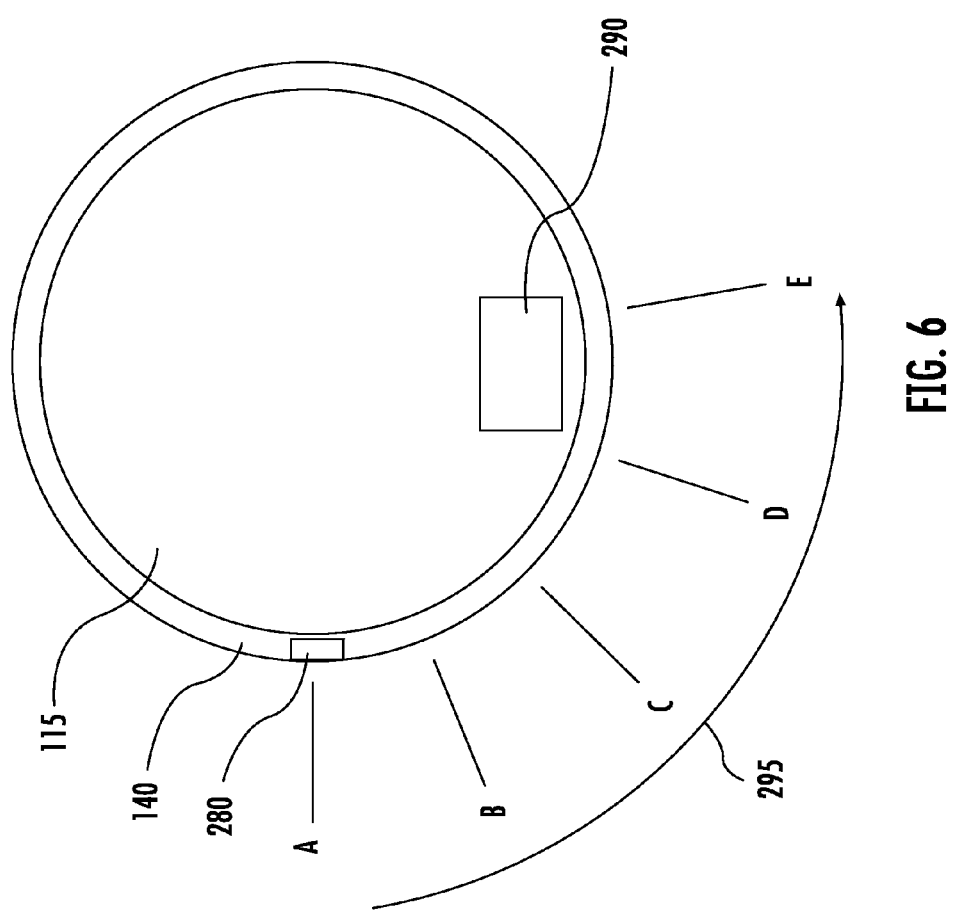
Figure 7:
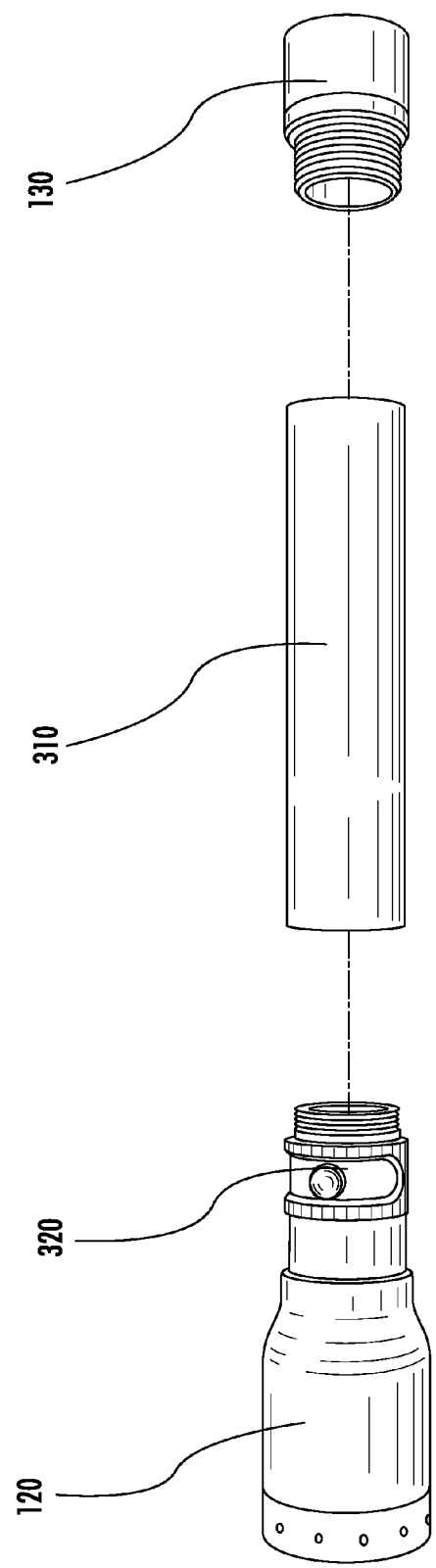
Figure 8:
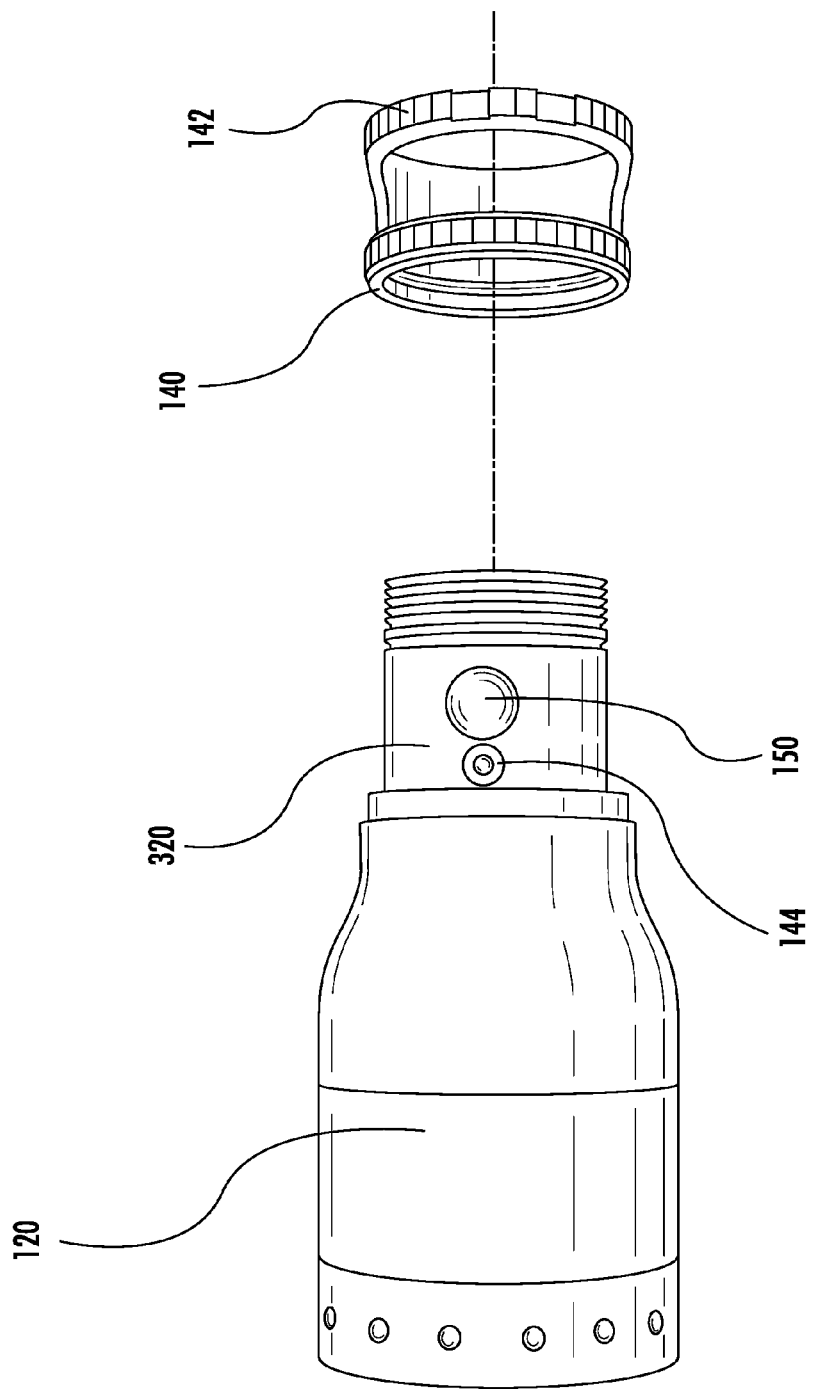
Figure 9:
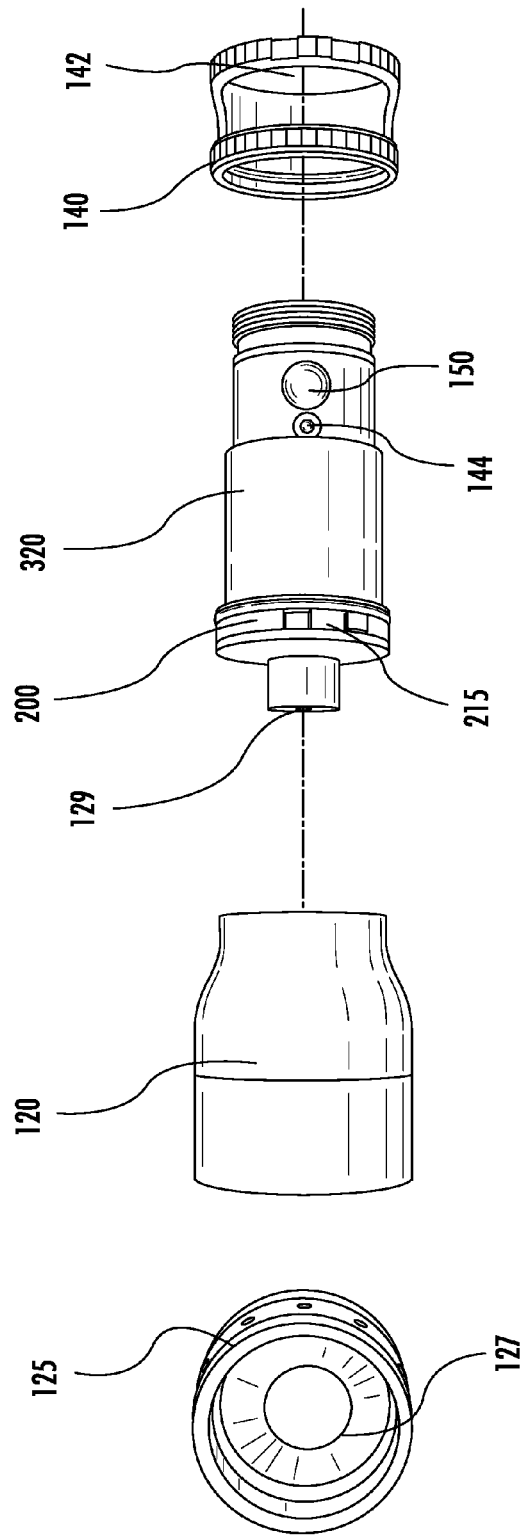
Figure 10:
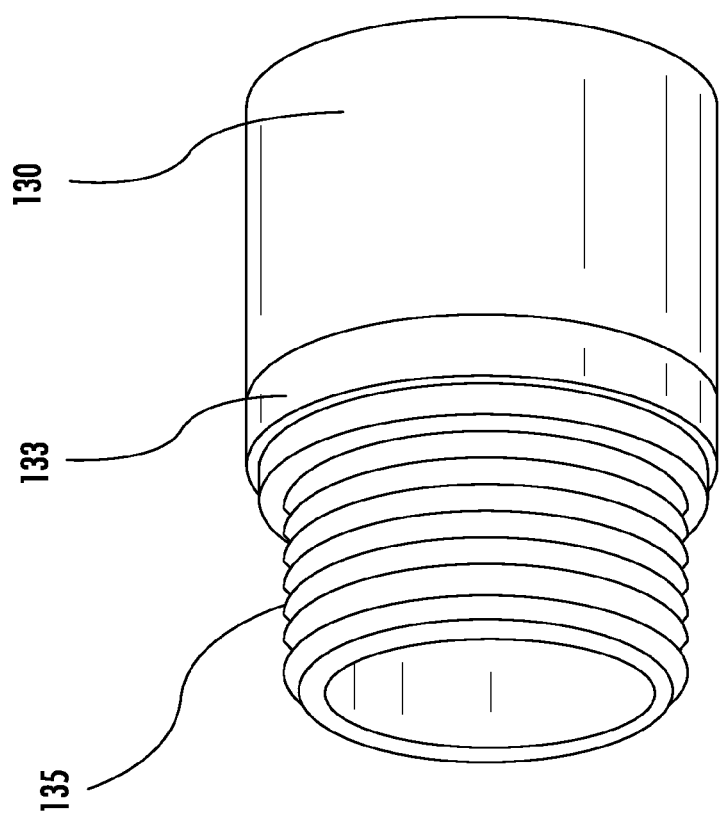
Figure 11:
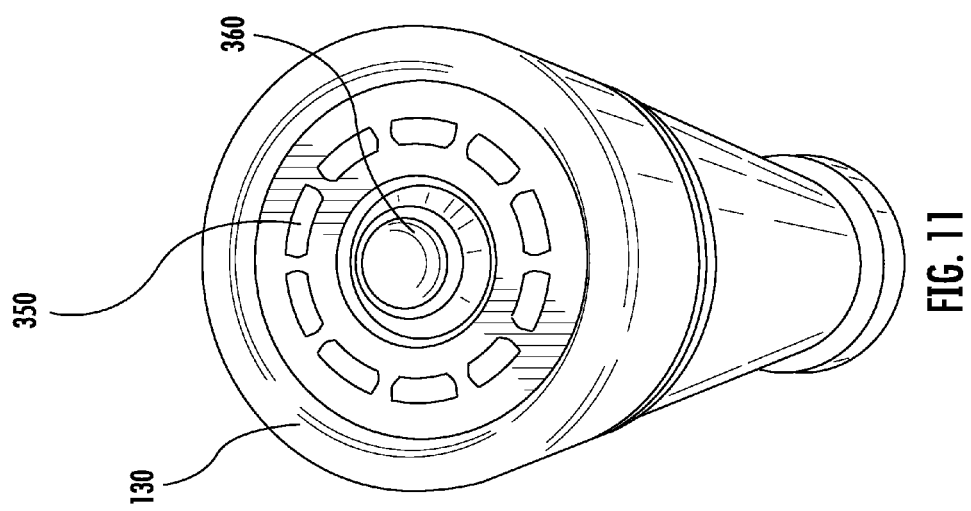
Figure 12:
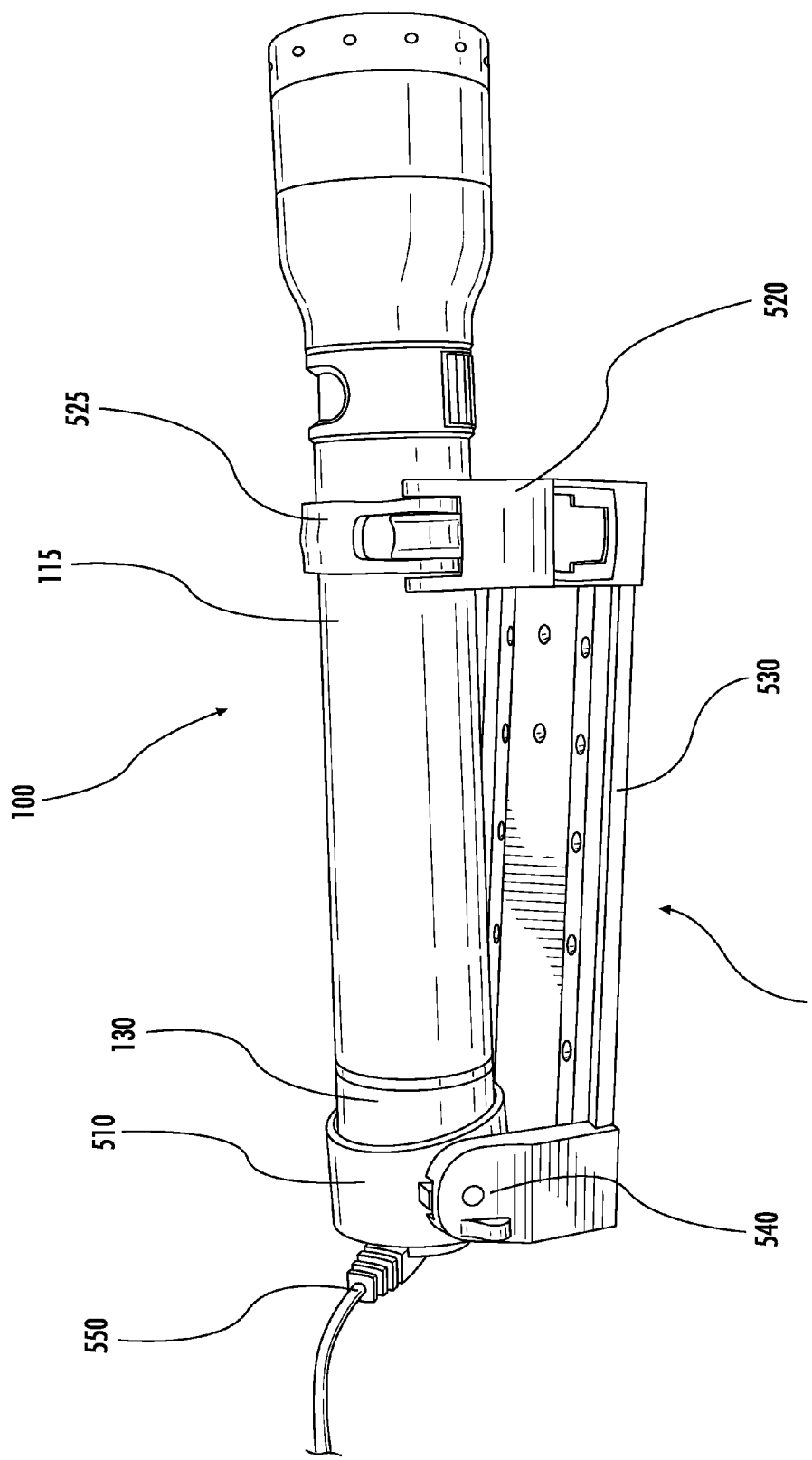
Figure 13:
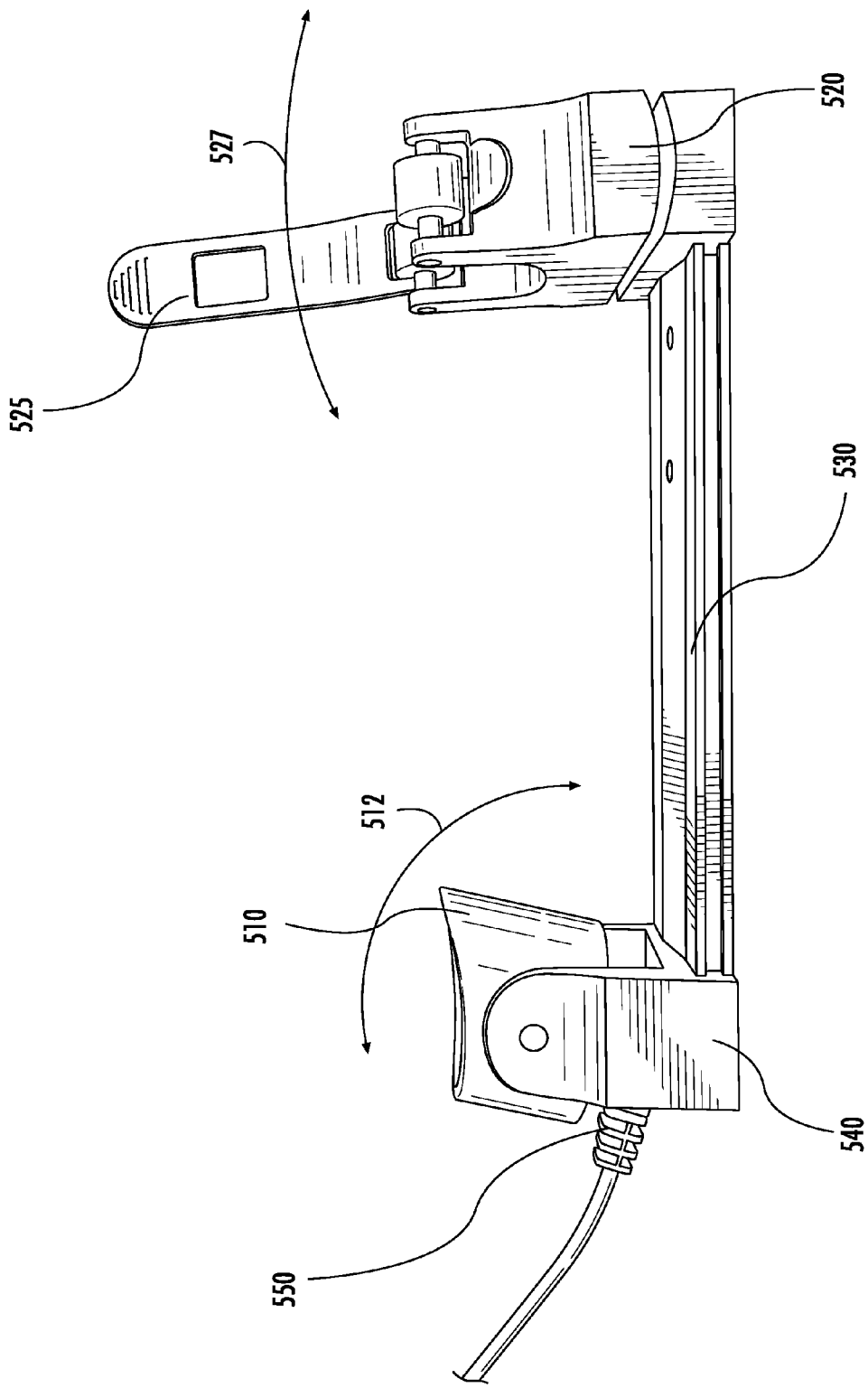

Having thus described the invention in general terms, reference will now be made to the accompanying drawings, which are not necessarily drawn to scale, and wherein:

FIG. 1 is an illustration of a flashlight which may implement embodiments of the present invention;

FIG. 2 illustrates the flashlight of FIG. 1 as viewed from the light source end;

FIG. 3 is a schematic illustration of the mechanism for increasing friction between the light source housing and the barrel of the flashlight according to example embodiments, arranged in the high-friction position;

FIG. 4 is a schematic illustration of the mechanism for increasing friction between the light source housing and the barrel of the flashlight according to the embodiment of FIG. 3, arranged in the low-friction position;

FIG. 5 illustrates the flashlight of FIGS. 1 and 2 as viewed from the light source end with the light source housing, lens, and bezel removed;

FIG. 6 is a schematic illustration of a contactless switch for changing modes of operation of a flashlight according to embodiments of the present invention;

FIG. 7 is an illustration of the flashlight of FIG. 1 with the base, power source housing, and switch portion of the barrel disassembled;

FIG. 8 is an illustration of the switch portion of the barrel of FIG. 7 with the adjustable ring removed;

FIG. 9 is an illustration of the switch portion of the barrel separated from the light source housing and the lens removed from the light source housing;

FIG. 10 illustrates the base of a flashlight according to example embodiments of the present invention;

FIG. 11 illustrates the charging port of the base if flashlight according to example embodiments of the present invention;

FIG. 12 illustrates a flashlight as engaged with a charging base according to a flashlight and charging base system of the present invention; and FIG. 13 illustrates a charging base according to example embodiments of the present invention.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Example embodiments of the present invention are generally described and depicted as embodied within a flashlight form factor; however, as will be apparent, embodiments of the present invention may be scalable and may be used in a number of form factors, such as head lamps, maritime lighting, search and rescue lights (e.g. floodlights, spotlights), among others. As such, the disclosure is intended to merely provide example embodiments and not to be limiting.

Referring now to the example of FIG. 1, embodiments of the present invention may be implemented in flashlights, such as flashlight 100 of FIG. 1 with a housing 110 that includes barrel 115, light source housing 120, and base 130. The light source housing 120 may include a bezel 125 configured to retain the lens as will be described further below, in the illustrated embodiment, the flashlight 100 includes an adjustable ring 140 and a switch 150. The illustrated embodiment depicts the switch 150 located within an elongate slot in the adjustable ring 140; however, in some embodiments, the switch 150 and adjustable ring 140 may be separate.

FIG. 2 illustrates the example embodiment of FIG. 1 as viewed from in front of the light source housing 120. As shown, the bezel 125 may retain the lens 127 within the light source housing 120. The light source 129 of the illustrated embodiment is a high-powered light-emitting diode (LED) and the lens 127 of the illustrated embodiment includes a refractive lens which can focus the light emanating from the LED based upon the distance of the light source 129 from the lens 127. While the illustrated embodiment includes a high-powered LED as the light source 129 and a refractive lens 127, embodiments may include various types of light sources, such as a plurality of LEDs, a combination of one or more LEDs and one or more incandescent bulbs, or any other light source which may benefit from embodiments of the present invention. Further, the lens 127 may be a refractive lens which focuses the light from the light source 129 as shown, or it may be a substantially flat lens which does not focus the light, but rather allows the light to pass through without substantial refraction. Embodiments with or without refractive lenses may include a reflector disposed within the light source housing 120 which may serve to reflect light emanating from the light source 129 out of the lens 127. In such embodiments with a reflector (e.g., a parabolic-shaped reflector), the reflector may be used to focus the light emanating from the light source 129.

Adjusting and Securing Focus of the Light Source

Referring again to the illustrated embodiment of FIGS. 1 and 2, the light source 129 may be held fixed relative to the barrel 115 of the housing 110, as will be further described with respect to FIG. 9. In order to focus the light emanating from the light source, the light source housing 120 may be moved relative to the barrel 115 (and thus relative to the light source 129). The light source housing 120 moving relative to the barrel 115 moves the lens 127 relative to the light source 129, thereby changing the focal length (the distance from the light source 129 to the center of the lens 127). Changing the focal length changes the focus of the light emanating from the light source, allowing the light pattern to be adjusted from a broad cone to a more focused beam.

The movement of the light source housing 120 relative to the barrel 115 may be accomplished by a sliding movement between the light source housing and the barrel. Upon adjusting the focal length to the desired setting, it may be desirable to lock the light source housing 120 relative to the barrel 115. Prior to "locking" the focal length to a desired setting, there may be a first level of friction between the light source housing 120 and the barrel 115 which is sufficient to prevent the light source housing from being loose on the barrel, but permits a user to easily move the light source housing relative to the barrel, along an axis extending generally along the barrel 115, to adjust the focal length. The friction may be increased between the barrel 115 and the light source housing 120 in response to rotating the light source housing 120 relative to the barrel 115 in a first rotational direction (about the major axis of the barrel). The increase in friction between the barrel 115 and the light source housing 120 may resist movement between the barrel 115 and the light source housing 120 along the major axis of the barrel. This friction increase may serve to "lock" the focal length. Rotating the light source housing 120 in a second rotational direction, opposite the first rotational direction, relative to the barrel 115 may serve to reduce the friction between the light source housing 120 and the barrel 115, thereby allowing relatively easy movement between the light source housing 120 and the barrel 115 along the major axis of the barrel. The term "lock", as used herein may not require the barrel 115 and light source housing 120 to be entirely prohibited from relative movement, but may define a relationship between the light source housing 120 and the barrel 115 in which it is substantially more difficult to change the focal length than when the barrel 115 and light source housing 120 are "unlocked."

The mechanism by which friction is increased and decreased may be achieved by a frictional element disposed about the circumference of a portion of the barrel that is received within the light source housing. The barrel 115 includes two opposing ramp shaped portions disposed about the circumference of the barrel. For purposes of illustration. FIG. 3 illustrates the opposing ramp shaped portions (200, 210) depicted flattened out or "unrolled" relative to their position about the circumference of the barrel 115. The first ramp shaped portion 200 is held fixed relative to the barrel 115A while the second ramp shaped portion 210, which is disposed on the barrel, includes a key 215 which is received in keyway 220 of the light source housing 120A. The second ramp shaped portion 210 is held fixed relative to the light source housing 120A when the key 215 is engaged with keyway 220. The key 215 is configured to engage the keyway 220 when the light source housing 120 is assembled onto the barrel 115.

As illustrated, in response to relative rotation in a first direction (shown in FIG. 3), with the light source housing 120A moving along arrow 250 and the barrel 115A moving along arrow 260, the ramps of the ramp shaped portions 200, 210 interface and combine to become thicker as shown by dimension "T". This "thicker" pair of ramp shaped portions disposed about the circumference of the barrel 115 create a higher friction interface between the light source housing 120 and the barrel 115 by creating a pressing force between the light source housing 120 and the barrel 115. Conversely, in response to rotation in the second direction, illustrated by FIG. 4 where the light source housing 120A moves along arrow 230 and the barrel 115A moves along arrow 240, the combined thickness of the ramp shaped portions 200 and 210 is reduced, as illustrated by dimension "t". Thus, the friction between the light source housing 120 and the barrel 115 is reduced, unlocking the barrel 115 relative to the light source housing 120 thereby allowing the focal length to be easily adjusted as described above.

FIG. 5 illustrates the light source housing 120 with the bezel and lens removed for ease of understanding. The housing 120 includes keyway 220 while the barrel 115, which is fixed relative to the light source 129, includes key 215. The two ramp shaped portions are disposed in a groove about the barrel 115 and are not visible in FIG. 5.

Adjusting Operational Modes

Referring again to FIG. 1, the housing 100 may include an adjustable ring 140 disposed about the barrel 115. The adjustable ring is configured to be rotated about the barrel between at least two distinct positions. The adjustable ring may include detents disposed on the inner circumference of the ring configured to engage a spring-biased tab, pin, or ball. As the adjustable ring 140 is rotated about the barrel 115, the spring-biased tab may be received in a detent corresponding to a distinct position of the adjustable ring 140. In some embodiments, the detents and spring-biased tab may not he present such that the adjustable ring 140 is rotatable about the barrel without substantial indexing defining the distinct positions; however, distinct positions of the adjustable ring 140 may still be achieved through other mechanisms, such as a user determining when a particular mode is achieved by the flashlight 100 to establish the positions. Other embodiments for defining distinct positions may also be used, such as a detent on the barrel and a spring-biased tab on the adjustable ring, and/or demarcations to align between the adjustable ring 140 and the barrel, among others.

In example embodiments where a detent exists for each distinct position of the adjustable ring, each distinct position of the adjustable ring may correspond to a mode of operation of the flashlight. For example, the light source 129 may be capable of operating in a bright mode and a dim mode, and possibly incremental steps of brightness therebetween. Each of these levels of brightness may be a mode of operation, such that distinct positions of the adjustable ring may correspond to a mode of operation corresponding to a particular brightness. Alternatively or additionally, the brightness may be substantially infinitely adjustable between the brightest level and the dimmest level, with no substantial detents between the two. A further mode of operation of the flashlight may include a strobe mode in which the light source is configured to flash periodically. In some example embodiments, different light wavelengths may be available as different modes of operation. For example, the light source 129 may include a visible, white light LED, an ultraviolet (e.g., 375-nanometer wavelength) LED, and an infrared (e.g., 10 m micrometer wavelength) LED. Each distinct position of the adjustable ring may correspond to operation of one of the LEDs providing different wavelength options.

As each distinct position of the adjustable ring may correspond to a particular mode of operation, the position of the adjustable ring must be communicated to the circuitry of the flashlight in order to properly operate in each mode of operation. Embodiments of the present invention may include a magnet disposed within the adjustable ring 140. Disposed within the housing may be a Hall effect sensor configured to sense the magnet disposed on the adjustable ring 140. The Hall effect sensor, using the voltage from a power source (as will be described further below), may generate a hall voltage. The hall voltage will vary depending upon the locational relationship between the magnet of the adjustable ring 140 and the Hall effect sensor. Based on established, calibrated hall voltages, the circuitry of the flashlight may use the hall voltage to determine what position the adjustable ring is in and operate the flashlight in the corresponding mode of operation.

FIG. 6 illustrates an example embodiment of the above described contactless switch. In the illustrated embodiment, the adjustable ring 140 is disposed about the barrel 115. The adjustable ring 140 may be rotated about the barrel 115 in the direction of arrow 295 between five distinct positions illustrated by lines A, B, C, D, and E. A magnet 280 on or in the adjustable ring 140 rotates with the adjustable ring relative to the barrel 115 and the Hall effect sensor 290 disposed therein. In each of positions A, B, C, D, and E. the hall voltage output from the Hall effect sensor is different based on the proximity of the magnet 280 to the Hall effect sensor 290. Thus, based on the position of the adjustable ring 140, the mode of operation of the flashlight may change.

The above described contactless switch to change the mode of operation of the flashlight may be desirable as the internal components of the flashlight, such as the circuitry, may remain encased in the barrel 115 and not be susceptible to environmental contaminants or the like outside of the barrel 115. For example, the barrel 115 may be submerged in water and there would be no negative impact on the functionality of the switch using the magnet and the Hall effect sensor. This arrangement further allows for cleaning of the switch mechanism by removal of the adjustable ring 140, as will be described further below.

Power Switch Assembly

Example embodiments of the present invention may be configured with a power switch that is separate from the adjustable ring 140 described above. In the illustrated embodiment of FIG. 1, the power switch 150 is disposed within an elongate slot of the adjustable ring 140. The power switch in this configuration may provide a user an intuitive method to determine the operational mode of the flashlight based upon the power switch 150 position within the elongate slot 142 of the adjustable ring. The power switch 150 may be in a fixed position relative to the barrel 115 such that the adjustable ring 140 rotates relative to the power switch 150. Based upon the position of the power switch 150 within the elongate slot 142, a user may intuitively know or recall the operational mode of the flashlight.

Further, according to the illustrated embodiment, situating the power switch 150 within the adjustable ring 140 allows for a more compact arrangement of the power switch and the adjustable ring 140 mechanism for selecting modes of operation. The multitude of functions is accomplished in substantially the same amount of space on the flashlight body as a power switch alone.

The power switch may be used to turn the flashlight on and off, whereas the mode of operation of the flashlight may be determined based on the position of the adjustable ring 140. Such a configuration may allow a user to set a mode of operation without having the flashlight on. This may be beneficial when a user is switching to a lower brightness mode or to an infrared mode, for example, as the user may not wish to cycle through a high brightness mode before reaching their desired mode. Thus, an advantage of the present invention may include selecting a mode of operation of the flashlight while the flashlight is off.

Additionally or alternatively, the power switch 150 may be configured to cycle the flashlight through sub-modes of operation of the flashlight. For example, in an embodiment where the different modes of operation include different light source wavelengths, the power switch may cycle between brightness levels of the light source wavelength that is selected using the adjustable ring 140. Such an embodiment allows the multiplexing of modes of operation between the adjustable ring 140 and the power switch 150, thereby increasing the functionality of the flashlight while not consuming any additional space along the flashlight housing for switches or buttons.

Flashlight Assembly

FIG. 7 illustrates an example of a flashlight, partially disassembled, according to embodiments of the present invention. The flashlight housing of example embodiments may include the flashlight base 130, the power source housing portion 310 of the barrel 115, the switch portion 320 of the barrel, and the light source housing 120. The power source housing portion 310 of the barrel 115 may receive the portable power source for powering the flashlight. The power source may include, for example, one or more batteries. In example embodiments of the present invention, the power source housing portion 310 may be interchangeable with alternative power source housing portions which may be configured, for example to receive more or fewer batteries, or batteries of a different type (e.g., "C-cell" size batteries versus "D-cell" size batteries). In an example embodiment, a power source housing 310 configured to hold two D-cell size batteries may be interchanged with a power source housing 310 configured to hold three D-cell size batteries, which may offer an additional twenty hours of operational power for the light source. Optionally, multiple power source housings may be coupled together to accommodate additional power source configurations.

The switch portion 320 of the barrel 115 and the base 130 may be configured to attach to the power source housing 310 by a threaded connection. For example, male threads of the base 130 may be received in the internal female threads of the power source housing 310. Similarly, external, male threads of the switch portion 320 of the barrel may be received in corresponding internal, female threads of the power source housing 310. A gasket, for example, a rubber gasket, bay be disposed about the base of the male threads of each of the base 130 and the switch portion 320 such that upon fully engaging the threads of the base 130 and the switch portion 320 with the power source housing 310, the power source housing may be substantially sealed against water, dirt, debris, etc.

FIG. 8 illustrates an example embodiment of the flashlight 100 of FIGS. 1, 2, and 7 with the adjustable ring 140 removed, illustrating the ease of cleaning of the assembly without contaminating or otherwise damaging the mode of operation selection switch. Further illustrated in FIG. 8 is the spring biased tab 144 configured to engage the detents disposed on the inner circumference of the adjustable ring 140 that define the distinct positions of the adjustable ring 140.

FIG. 9 illustrates the example embodiment of FIG. 8 with the switch portion 320 of the barrel 115 disassembled from the light source housing 120 and the bezel 125 (including lens 127) disassembled from the light source housing 120. The light source 129 is shown attached to the switch portion 320 of the barrel 115 together with the ramp shaped portion 200 and key 215 which combine with a keyway of the light source housing 120 to reduce inadvertent alteration of the focal length as described above.

FIG. 10 illustrates an enlarged view of the base 130 of the embodiment of FIG. 7. The base 130 include the threaded portion 135 which is configured to be received within the power supply housing 310 and charge status indicator 133. The charge status indicator 133 of the illustrated embodiment is a translucent ring that extends about the base (about the major axis of the barrel 115), but may not protrude from the surface of the base. The charge status indicator 133 may be configured to glow a first color in response to a charge level of the power source being above a threshold, and glow a second color in response to the charge level of the power source being below the threshold. The charge status indicator 133 may glow when the power source is being charged or when the flashlight is on (i.e., the light source is illuminated).

FIG. 11 illustrates the base 130 of the flashlight 100 as viewed from the bottom end of the flashlight, opposite the light source 129. The base 130 of the flashlight 100 may include a plurality of charge level indicator lights 350, which may be, for example LEDs. The charge level indicator LEDs may provide an indication of charge level of the power source, in a similar manner as the charge status indicator 133 of FIG. 10. The plurality of charge level indicator lights 350 may provide a visual indication of the charge level in a more granular manner than the charge level indicator 133. For example, the illustrated embodiment includes ten charge level indicator lights 350. Each of the lights may correspond to a charge level. In one embodiment, each light may correspond to 10% of the maximum or full charge level of the power source. One light of the plurality of charge level indicator lights 350 being illuminated or glowing may indicate a 10% charge level, whereas four lights of the plurality of charge level indicator lights 350 being illuminated may indicate a 40% charge level (of a maximum 100% charge level).

The plurality of charge level indicator lights 350 may also glow in colors indicative of the charge level. For example, when the charge level is less than 100%, the illuminated charge level indicator lights 350 that are glowing may glow red. When all of the charge level indicator lights 350 are illuminated, indicating a 100% charge level, the charge level indicator lights 350 may glow green. Optionally, the charge level indicator lights 350 may each glow green after reaching a predefined threshold charge level threshold, such as 70%, above which the lights glow green. Similarly, the charge level indicator 133 of FIG. 10 may glow green above a predefined charge level threshold (e.g., 70%). The plurality of charge level indicator lights 350 may be illuminated during charging of the power source and/or during operation of the flashlight, for example, when the flashlight is on.

The charge level indicator lights 350 may optionally be configured to display the time remaining or percentage of battery life left based on an operational mode of the flashlight. For example, at full brightness, a flashlight of example embodiments may have a battery life of one hour. After thirty minutes, the charge level indicator lights 350 may display fifty percent power or battery life remaining at the current operational mode of the flashlight. The same flashlight may be configured to operate in a strobe operational mode, where the strobe uses considerably less power than the full brightness operational mode. After thirty minutes of use on the full brightness operational mode, the charge indicator lights may indicate fifty percent life. Upon switching to the strobe operational mode, the charge indicator lights may display a higher percentage life, such as 90% as the strobe operational mode consumes less power.

Optionally, the charge level indicator lights 350 may be configured to display battery life in time units, such as 15 minute increments. Upon a full battery charge, in the full brightness operational mode, less than all of the charge indicator lights 350 may illuminate as the full charge may provide only one hour of battery life in that mode. As such, only four charge level indicator lights may illuminate. When operating in a lower brightness operational mode at a full charge the charge level indicator lights may all be illuminated, indicating two and a half hours of operation remain. In some operational modes, the battery life may exceed the number of charge indicator lights. In such an embodiment, the charge indicator lights may all be illuminated until the charge level falls below the point where less than two and a half hours of battery life remain in that operational mode.

Further illustrated in FIG. 11 is the charge port 360 of the flashlight 100. The charge port 360 may include two electrical connections (a positive and a negative or neutral), where a first one of the electrical connections is disposed in the center of the second electrical connection, which is a concentric ring about the first electrical connection. The two electrical connections may be separated by an insulating layer, such as plastic or other non-conductive material. One advantage of this arrangement of electrical connections is that the orientation of the charge adapter about the major axis of the barrel is unimportant, and the flashlight may be inserted into a charging base (as described further below) in any position as rotated about the major axis of the barrel. Example embodiments may further include a magnetized charge port 360 which magnetically attracts the charge adapter as the flashlight 100 is mounted into the charging base. This configuration encourages the electrical connection to be established between the charge adapter and the charge port 360. Alternatively, the charge adapter may be magnetized while the charge port 360 of the flashlight includes a magnetically attractive material, such as a ferrous metal. In either configuration, the charge port 360 is encouraged to establish proper electrical connection with the charge adapter.

Charging Base

FIG. 12 illustrates an example embodiment of a flashlight 100 according to the above described embodiments mounted to a charging base 500. The charging base 500 may include a receiver 510 configured to receive the base 130 of the flashlight 100. The charging base 500 may further include a cradle 520 configured to receive the barrel 115 of the flashlight 100. The cradle 520 may include a strap 525 configured to secure the barrel 115 of the flashlight 100 in the cradle 520. The strap may be an adjustable strap to accommodate flashlights and barrels of varying sizes, and/or the strap may be made of an elastic material to accommodate various sized flashlights. The strap may be engaged and disengaged from the cradle 520 to allow the flashlight 100 to be easily mounted and removed from the charging base 500.

As shown in FIG. 12, the receiver 510 may be pivotably coupled to a base plate 530 of the charging base 500 by one or more receiver support(s) 540. The receiver support(s) 540 may be mounted on one end to the base plate 530 and on the other end pivotably coupled, such as through a pin, to the receiver 510. The charging base 500 may further include charge adapter 550 received within the receiver 510. The charge adapter 550 may be removably coupled to the receiver 510 such that the charger 550 can be used independently of the charging base 500 as will be described further below.

FIG. 13 illustrates the charging base 500 of FIG. 12 with the flashlight removed. As shown, the strap 525 may be disengaged from the cradle 520 to allow the flashlight to be removed. The receiver 510 pivots on receiver supports 540 along arrow 512 to allow the flashlight to be easily removed from the receiver 510. The charge adapter 550 pivots with the receiver 510. The receiver 510 may be substantially a cup-shape with an opening of the cup-shaped receiver configured to receive the base of the flashlight. The charge adapter 550 may be disposed at the bottom of the cup-shaped receiver 510 for coupling to the charge port 360 of the flashlight. The receiver 510 may be spring biased to a position where the opening is substantially facing away from the base plate 530. Such a configuration may allow the base 130 of a flashlight to be easily inserted into the receiver 510 before pivoting the flashlight (and receiver 510) toward the cradle 520 in order to secure the flashlight to the charging base 500. In an example embodiment, the receiver 510 is spring biased to an angle of 45°+/−10° from the plane of the base plate 530. Biasing the receiver 510 to a specific, consistent position may ensure that the cup-shaped receiver is oriented in the same position such that a user may quickly and easily insert a flashlight base (e.g., flashlight base 130) into the receiver 510. A user may learn the insertion position of the receiver 510 thereby allowing the user to quickly insert a flashlight 100 into the charging base 500 without requiring the full attention of the user.

In some example embodiments, the receiver supports 540 and/or the cradle 520 may be secured to the base plate 530 via set screws or via hand-tightenable screws which may allow a user to quickly adjust the position of the receiver supports 540 and/or the cradle 520 along the length of the base plate 530.

The cradle 520 of the charging base 500 may include clamping rollers 527 arranged on either side of the cradle 520 configured to receive therebetween a flashlight barrel. The clamping rollers may both guide the flashlight barrel into the cradle 520 and may hold the barrel more securely when coupled with the strap 525. Both the strap 525 and the clamping rollers 527 may be made of an elastomeric material such as rubber to allow a degree of flexibility and deformation during insertion and removal of a flashlight barrel.

The cradle 520 of the charging base 500 may be pivotably mounted to the base plate 530. The cradle 520 may be pivotable along arrow 527 in order to accommodate flashlights of different sizes. Further, both the receiver 510 and the cradle 520 may be adjustably received by the base plate 530 to allow adjustment of their positions along the length of the base plate 530.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A flashlight comprising:
  a light source;
  a charge level indicator;
  a housing defining a major axis along which the housing extends, the housing having a barrel;
  an adjustable ring disposed about the housing, wherein the adjustable ring is configured to be rotated between at least two positions, where each of the at least two positions define a different mode of operation; and
  a button switch disposed on the barrel and encircled by an elongate slot within the adjustable ring, wherein the button switch is configured to turn the flashlight on and off.

2. The flashlight according to claim 1 further comprising a Hall effect sensor, wherein the adjustable ring comprises a magnet, and wherein the at least two positions of the adjustable ring are recognized by the position of the magnet relative to the Hall effect sensor.

3. The flashlight according to claim 1, wherein the modes of operation include two or more of a strobe mode, a bright mode, a secondary light wavelength mode, and a dim mode.

4. The flashlight according to claim 1, wherein the housing comprises a light source housing, wherein the light source housing comprises a lens and is adjustable relative to the barrel along the major axis to focus a beam of light emanating from the light source.

5. The flashlight according to claim 4, wherein the barrel and the light source housing are adjustable relative to one another along the major axis.

6. The flashlight according to claim 4, wherein the barrel and the light source housing are rotatably engaged.

7. The flashlight according to claim 6, further comprising a first ramp shaped portion and a second ramp shaped portion, wherein the first ramp shaped portion is held fixed relative to the barrel, and wherein the second ramp shaped portion is held fixed relative to the light source housing, wherein the first ramp shaped portion and the second ramp shaped portion cooperate to increase a friction force between the barrel and the light source housing in response to rotation between the barrel and the light source housing in a first direction, and wherein the first ramp shaped portion and the second ramp shaped portion cooperate to decrease the friction force between the barrel and the light source housing in response to rotation between the barrel and the light source housing in a second direction, opposite the first.

8. The flashlight according to claim 6, wherein rotation of the light source housing in a first rotational direction relative to the barrel increases the friction force resisting movement between the light source housing and the barrel, and rotation of the light source housing in a second rotational direction, opposite the first rotational direction relative to the barrel, decreases the friction force resisting movement between the light source housing and the barrel.

9. The flashlight according to claim 4, wherein the barrel is configured to hold a first power source, and wherein the barrel is interchangeable with a second barrel that is configured to hold a second power source that is different than the first power source.

10. The flashlight according to claim 1, wherein the adjustable ring is configured to be removable from the housing.

11. The flashlight according to claim 1, wherein the charge level indicator comprises a charge indicator ring disposed about the major axis.

12. The flashlight according to claim 11, wherein the charge indicator ring is configured to glow a first color in response to the charge level of the power source being above a threshold charge level, and wherein the charge indicator ring is configured to glow a second color in response to the charge level of the power source being below the threshold charge level.

13. The flashlight according to claim 12, wherein the charge indicator ring is configured to glow in response to the light source being on, and is configured to not glow in response to the light source being off.

14. The flashlight according to claim 1, wherein the housing defines a base and wherein a plurality of charge indicator lights is disposed about the base.

15. The flashlight according to claim 14, wherein the plurality of charge indicator lights glow in response to the charge level of the power source.

16. The flashlight according to claim 15, wherein the number of charge indicator lights glowing change in response to a change in the operational mode of the flashlight.

17. A charging base for a flashlight comprising:
a base plate configured to be mounted to a surface;
a receiver pivotably secured to the base plate and configured to pivot about a first axis and to receive a base of the flashlight axially inserted therein;
a cradle pivotably secured to the base plate and configured to receive a barrel of the flashlight, wherein the cradle is configured to pivot about a second axis relative to the base plate to align with the base of the flashlight received within the receiver, wherein the first axis is substantially parallel to the second axis and substantially perpendicular to a longitudinal direction of the base plate; and
a charge adapter configured to be received by the receiver and to engage the base of the flashlight.

18. The charging base according to claim 17, wherein the charge adapter is configured to be removable from the receiver for use independent of the receiver.

19. The charging base according to claim 17, wherein the receiver is substantially a cup shape comprising an opening, wherein the base of the flashlight is received within the cup through the opening, and wherein the receiver is biased to a position where the opening of the cup is facing away from the base plate.

20. The charging base according to claim 17, wherein the charge adapter is magnetized and wherein the base of the flashlight is attracted to the magnetization of the charge adapter.

21. A flashlight and charging base system, comprising:
a flashlight, comprising:
   a light source;
   a housing defining a major axis along which the housing extends, the housing having a barrel;
   an adjustable ring disposed about the housing, wherein the ring is configured to be rotated between at least two positions, where each of the at least two positions define a different mode of operation; and
   a switch located disposed on the barrel and encircled by an elongate slot within the adjustable ring, wherein the switch is configured to turn the flashlight on and off; and
a base comprising:
   a base plate;
   a receiver pivotably secured to the base plate and configured to receive a base of the flashlight;
   a cradle pivotably secured to the base plate and configured to receive a barrel of the flashlight; and
   a charge adapter configured to be received by the receiver and to engage the base of the flashlight.

* * * * *